United States Patent Office

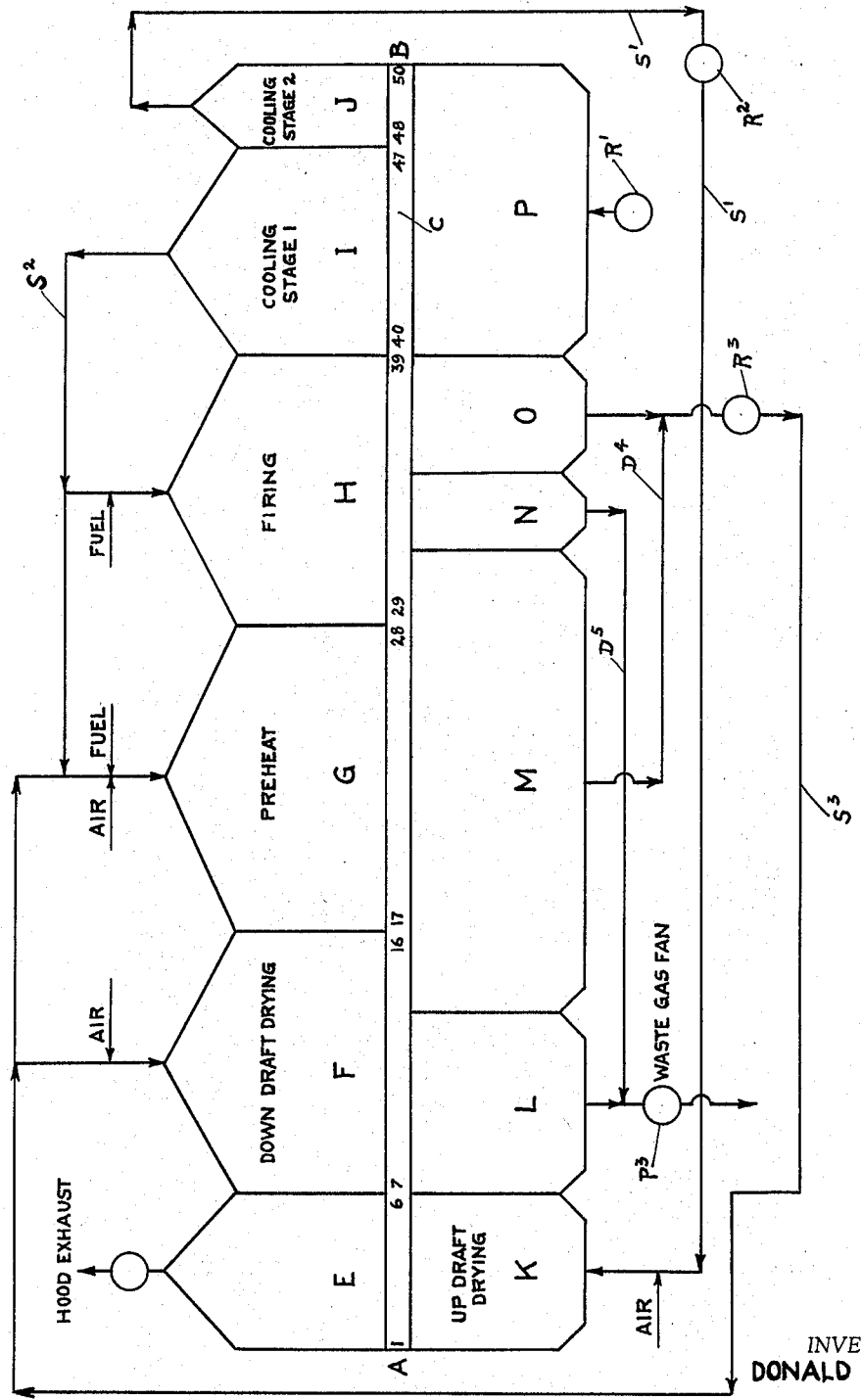

3,285,735
Patented Nov. 15, 1966

3,285,735
REMOVAL OF CONTAMINANTS SUCH AS ARSENIC FROM IRON ORE AND APPARATUS THEREFOR
Donald D. Phelps, Coraopolis, Pa., assignor to Dravo Corporation, Pittsburgh, Pa., a corporation of Pennsylvania
Filed Dec. 2, 1963, Ser. No. 327,476
7 Claims. (Cl. 75—6)

This invention relates to preparation of iron ore for use in a blast furnace or other reducing operation where the ore is either formed into pellets which are then indurated or hardened by heating them to high temperature or to the agglomeration of such ore by sintering. More especially the invention is for the processing of iron ore on a sintering strand to remove certain contaminating inclusions, particularly arsenic.

Iron ore from some areas, as for example ore in the Steep Rock Lake deposits in Canada, contains small amounts of arsenic. Whether this occurs as elementary arsenic or as a compound, such as an oxide, has not been established, but when ore containing arsenic is reduced in a blast furnace, the arsenic combines with the iron, imparting to the metal undesirable qualities, notably brittleness. The economical removal of the arsenic from the ore has heretofore not been achieved, and the present invention provides for the removal of most of the arsenic economically and incident to the indurating of pellets or by sintering on a traveling grate or sintering machine.

Iron ore which has been separated from the gangue or earthen substances with which it occurs in the mine, is commonly prepared for reduction in a blast furnace by forming it into pellets, charging the "green" pellets so formed onto a traveling grate machine in which the pellets are dried, preheated, fired at high temperature, and then cooled. The economy of the process depends upon the effective use of heat required in this operation, as a result of which heated gases that pass through pellets are recycled through the bed of pellets at some other stage to recuperate the heat.

The present invention desirably makes use of a process and apparatus as disclosed in Phelps and Anthes application Serial No. 172,554, filed February 12, 1962, now issued as Patent 3,172,754, dated March 9, 1965, with slight modification. As is common in apparatus of this kind, the traveling grate comprised of a succession of pallets, moves horizontally beneath hoods and over a succession of windboxes from a charging end to a discharging end. At the discharge end the pellets are cooled by air being forced upwardly through the bed. The hottest portion of this air, i.e. from the forward end of the cooling zone, flows by its pressure into the hood of the preheating, firing and after firing zones where it provides secondary combustion air. The air and gases in the firing and after firing zones are drawn downwardly through the bed into these zones. The hottest portion of these gases, i.e., the rear end of the firing and in the after firing zone, are carried forward and passed through the green pellets to dry them, and this gas is then exhausted to atmosphere, as are the relatively cooler gases that flow downwardly through the bed in the preheating zone. Likewise, air that is passed upwardly through the bed of pellets at the rear end of the cooling zone is carried forwardly and is caused to flow through the bed of pellets in the drying zone. The significance of this will appear later, but it illustrates a successful method and apparatus for the recuperation of heat from combustion gases themselves, and from the cooling of the pellets. Since the cost of fuel is an important factor in the preparation of ore, the recuperation of heat is important to the economy of the operation.

While I have specifically referred to a pelletizing method, essentially the same procedure is followed where the ore is supplied without pelletizing onto the hearth layer of a sintering strand, and this invention is applicable to heat induration or agglomerating by either pelletizing or sintering.

If ore, containing arsenic, is heated to a critical temperature, usually above 2300° F., a high percentage of the arsenic will be driven out of the ore. For example, the ore from the Steep Rock Lake region of Canada contains between 0.023% and 0.047% of arsenic calculated as metallic or uncombined arsenic. If a bed of pellets derived from this ore is heated for three minutes with the pellets in the bottom of the bed at 2350° F. by the downflow of heated gases through the bed, the arsenic can be reduced to the range between 0.008% and 0.01%. To accomplish this there must be a firing time of 8 to 9 minutes at 2450° F. and an after firing time of about 2 minutes, assuming the bed of pellets to be of normal thickness. After the quantity of arsenic has been reduced to this degree, the cost of further processing to reduce it further does not justify doing so and in this amount is relatively inconsequential. The arsenic so removed is taken up by the air passing through the bed, and if this air is recycled through the bed for drying the pellets, the arsenic will be deposited on the cold or cooler pellets, so that with the continued firing of additional pellets there would be an increasing concentration of arsenic to a point where there would be no effective removal of the arsenic.

According to this invention there is provided an apparatus and method whereby the heat is effectively recuperated, but the gases having the heaviest concentration of arsenic are vented to the stack in such amount that the arsenic carried out the stack is about equal in any unit of time to the amount of arsenic supplied by the feed material in the same period of time.

For example:

To produce one long ton (L.T.) of finished product, 2359 pounds of dry ore is required, this being derived from the formula:

$$\frac{2240 \text{ lbs./L.T.}}{1-.053 \text{ (loss on ignition)}} = 2359 \text{ lbs.}$$

Assuming the arsenic in the ore to be 0.023%, then 2359 lbs.×.0023=.543 lb. arsenic in the feed pellets required for each long ton of finished pellets.

Assuming that there remains in finished product .008% arsenic, then the amount of arsenic remaining in a long ton of finished product equals:

$$2240 \text{ lbs.} \times .0008 \text{ (As)} = .182 \text{ lb.}$$

Then
.543 lb. of As in the green pellets, minus
.183 lb. of As in the finished product=

.361 lb. of As which must be carried out by exhaust gases for each long ton of pellets produced.

Preliminary tests to determine the amount of arsenic by weight in the windbox gases per minute from the start of top firing at 2450° F. indicate the following:

| Minutes from start of 2450° firing: | Lbs./minute/L.T. product in windbox gases |
|---|---|
| 0–1 | .002 |
| 1–2 | .006 |
| 2–3 | .034 |
| 3–4 | .129 |
| 4–5 | .183 |
| 5–6 | .168 |
| 6–7 | .133 |
| 7–8 | .089 |
| 8–9 | .058 |
| 9–10 | .049 |
| Lbs. As/L.T. product | .851 |

In the windbox gases from the beginning of the third minute of high temperature firing to the end of the sixth minute there are .129+.183+.168=.480 lb. of arsenic in the windbox gases per long ton of finished product being produced. Since as shown in the example .361 lb. of arsenic must be removed for each long ton of product to prevent any build-up of arsenic in the finished product, the venting of gases from the windboxes of the sintering machine for the three minutes of travel beginning with the third minute and ending with the sixth will be more than adequate to prevent a build-up of arsenic in the pellets. Hot gases resulting from the firing of the pellets any time after the sixth minute in this example may be recycled through the bed of pellets for drying the pellets, and thereby recuperate much of the heat in these gases.

These figures are based on the assumption that the bed of pellets is of such thickness and permeability, and the rate of firing is such that the pellets in the bottom of the bed are at a peak temperature over 2300° F. and of the order of 2350° has been reached at the beginning of the third minute and continued through the sixth. For a thicker or less gas-permeable bed, or with a lower rate of combustion in the firing zone, the required temperature in the bottom of the bed might not be reached at the end of two minutes and the gases might then have to be vented at a later time or for more than three minutes. It can be determined in each case by the calculations outlined above where the windbox gases under the firing zone contain the most arsenic, and thereby determine the point where gases can be most advantageously exhausted to atmosphere without recycling and the distance beyond this point where the gases are thus wasted to carry off the arsenic at a rate comparable to the rate at which it is supplied in the feed material. By adjusting the volume of waste gas and the distance along the grate where gases are so wasted, this condition of substantial equilibrium between the input of arsenic and the removal thereof to a zone where the windbox gases contain the most arsenic, the loss of heat can be minimized. Since the amount of arsenic in the ore cannot be economically reduced below .008%, there is no advantage in exhausting arsenic, and thereby wasting heat, at a rate much faster than the rate theoretically necessary to maintain equilibrium between the rate of feed and the exhaust rate. Consequently all remaining hot gases, even though they contain arsenic, can be recycled to recuperate the heat without affecting the effectiveness of the arsenic removal.

The nature of the invention and the method of operating it may be more fully understood by reference to the accompanying drawing, wherein the figure is a schematic flow sheet representative of a traveling grate sintering machine wherein any details of construction have been omitted.

The sintering apparatus itself is of the so-called Dwight-Lloyd type in which a series of abutting pallets providing a continuous horizontal moving grate carry the ore pellets or charge from a feed (not shown) at the charging end A to the unloading end B. The path of the pallets from the start of processing to the finish is indicated by the band C, and the numbers along this band refer to minutes of travel.

There is a continuous succession of hoods over the sintering strand C, these being designated E, F, G, H, I and J. There are a series of windboxes under the strand arranged in groups, these groups being designated K, L, M, N, O and P. The arrangement corresponds closely, but not exactly, to the arrangement shown in the Phelps and Anthes patent above referred to.

There is updraft drying at the beginning of the process effected by the upflow of warm air from the windboxes in zone K through the charge on the grate into hood E. There is downdraft drying from the flow of heated gases from hood F to the windboxes in zone L, and preheating takes place from hood F to the first windboxes in zone M. Downdraft preheating with hotter gases takes place from the flow of gases from hood G into the middle area of the windboxes of zone M. Firing and after-firing occurs in the next zone, highly heated combustion gases flowing from hood H into the rear end of zone M, and also into the windboxes of zones N and O. Ambient air is forced into the windboxes of zone P upwardly through the charge into hoods I and J to cool the indurated product. Cooling air is forced into the windboxes of zone P by a blower R' at a rate to maintain a positive pressure of air in the hood I.

The air flowing through the bed near the discharge end into hood J is cooler than the air that is forced into hood I ahead of it. Air from hood J is moved by fan $R^2$ through duct $S^1$ to the windboxes K for updraft drying. Ambient air may also be introduced into some or all of these windboxes, as explained in the Phelps and Anthes application, as indicated in the drawing.

A positive pressure of air is maintained in the hood I and this air is too hot to be moved by a fan. It flows under its own pressure through duct $S^2$ into the high temperature firing hood H, providing secondary combustion air for burners in this hood. Also some of it flows into the preheat hood G where there may also be fuel burners in all or part of the preheat hood for which this hot air provides secondary combustion air, with primary air from outside the machine being also provided, as indicated in the drawing.

The highly heated air and combustion gases entering wind-boxes in zone or section O contain arsenic. These gases are forced by fan $R^3$ through duct $S^3$ to the downdraft drying hood F, and a portion of these gases is directed into the preheating hood section G. Because these gases contain arsenic, they cannot be used for updraft drying without danger of leakage and possible harm to persons around the machine, whereas the windbox seals are more effective when these gases are pulled down by suction through the bed of pallets into the windboxes of group L by waste gas fan $P^3$ and exhausted to a stack. Gases and air are pulled down into windboxes in group M through duct $D^4$ which connects into the duct leading from section O by fan $R^3$; these gases from M mixing with the hotter gases from O reduce the temperature, but increase the volume of gases flowing through $S^3$. There will be some arsenic in the gases from windboxes in section M.

Section N covers approximately a three-minute span and is in the area where the bottom of the charge has reached about 2350 F. In other words at minute 29 is where the top firing at about 2450° F. begins, and in the next three minutes the bottom temperature of the charge reaches its maximum. The time span 32 through 34 corresponds to the 3 to 6 minute span in the table previously described. The gases entering windboxes N are therefore carried through duct D⁵ directly to the waste gas fan P³ to the stack. In this way it is assured that the quantity of arsenic exhausted from the system is roughly comparable but not less than the rate at which it is supplied by feed material so that there is approximately an equilibrium between the rate at which arsenic is supplied by the feed and the rate at which it is removed, with the result that the concentration does not build up and the finished product will contain only between 0.008% and 0.01 of arsenic.

As above explained, the recuperation of the heat makes it uneconomical to vent more of the highly heated combustion gases to the waste gas fan than is necessary to remove arsenic at the approximate rate at which it is being supplied in the feed material. Controlled in this way, the heat loss for arsenic removal is not excessive and the process is commercially economical.

In the specific example here described the calculation is based on heat-hardening pellets of iron ore from a particular area. The point at which the venting of gases to the atmosphere will vary according to the permeability of the bed, the depth of the bed, the speed of travel of the grate, the rate of gas flow, and the amount of arsenic in the ore. However, knowing the amount of arsenic in the feed material and knowing that it is not feasible to reduce the arsenic content by sintering or heat-hardening pellets below about .008%, one skilled in the art need only determine the point where the lower portion of the bed reaches a temperature above 2300° F. to determine the most advantageous location or point in the time cycle at which to begin the removal of gases to be wasted with the least loss of heat to establish equilibrium between the rate that arsenic is introduced by the feed material and the rate at which it is removed, and to determine the volume of gases required to be wasted, or the number of minutes of travel time where the gases are required to be wasted.

As hereinbefore stated, the invention is applicable also to the sintering of ore as well as to heat-hardening pellets, but in sintering the initial stages of drying and preheating are less critical. For example, in the heat-hardening of pellets, an initial stage of updraft drying is desirable, because with downdraft drying, a moisture extracted from the top layer of pellets may condense on the cold pellets below and soften the green pellets to a point where they will be mashed down by the weight of the overlying pellets, whereas if the gases travel first upwardly through the pellets, condensation occurs in the upper layers where the pellets are not supporting the weight of a superimposed body of pellets. With sintering, this is not a factor. Therefore the same flow of gases to recuperate heat might not be used, but in either case, where the arsenic or other contaminant must be removed at high temperature and will condense on the feed material at low temperature, the system requires that a portion of the high temperature gases from the firing zone be wasted, and the most economical place to remove the most contaminant with the least waste of heat is in the firing zone where the concentration of contaminating vapor is greatest, i.e. about where the bottom of the bed first reaches the temperature at which the contaminant vaporizes and between the beginning and end of the firing zone. The remaining gases, even though they carry arsenic or other condensible contaminant, are used in a preliminary stage in either case to recuperate as much heat as possible.

It should be appreciated that while the individual windboxes have not been shown, but the grouping of the windboxes has been designated, the usual practice of a damper to control the flow in each windbox, as disclosed for example in the Phelps and Anthes patent, is desirably followed in the present method.

I claim:

1. In the method of operating a sintering strand having a traveling grate onto which ore to be processed at high temperature is continuously charged and which moves the ore over a succession of windboxes through a preliminary zone followed by a firing zone and then a cooling zone and wherein the gases that pass through the ore in the firing zone into the windboxes are recycled to the preliminary zone to pass through the freshly charged material, the ore being one containing a contaminant that is vaporized in the firing zone and which will condense on the freshly charged ore, the steps which comprise separately removing from the windboxes under the firing zone those combustion gases in which the vaporized contaminant is most concentrated at a rate such that the contaminant in the gases so removed closely approximates and is not less than the rate at which the contaminant is supplied to the strand by the feed material, wasting the gases so separately removed to atmosphere, and recycling remaining gases from the firing zone which also carry some contaminant to the preliminary zone where it passes through the bed of ore, whereby the contaminant is exhausted by the gases so removed and vented to atmosphere at about the same rate that it is supplied by the incoming ore with the recuperation of heat from the gases which are recycled.

2. The steps in the method of processing ore at high temperature as defined in claim 1 wherein the volume of gases separately removed and vented to atmosphere is less than the volume which is recycled.

3. The steps in the method of processing ore at high temperature is defined in claim 1 wherein the gases which are so separately removed and vented to atmosphere are derived from a portion of the length of the firing zone intermediate the beginning and end of the firing zone.

4. The steps in the method of processing ore at high temperature as defined in claim 1 wherein the gases so removed and vented to atmosphere are derived from a location between the beginning and end of the firing zone and for a period of time less than half the time that the ore is passing through the firing zone.

5. In the process of firing iron ore containing arsenic on a traveling grate machine where ore to be fired is continuously supplied to one end of the grate and continuously discharged from the other and extends as a continuous bed from the charging end to the discharge end, wherein the ore is carried first through a preliminary zone where hot gasses are passed through it and then successively through a firing zone where combustion gases pass through it and then a cooling zone, the steps which comprise heating the ore on the grate in the firing zone by the downflow of hot air and combustion gases until the temperature in the lower part of the ore bed reaches a maximum temperature which exceeds 2300° F., separately collecting heated air and combustion gases that have passed through the bed of ore in the firing zone from the point where the lower portion of the bed first reaches said maximum temperature to a further point where said maximum temperature still prevails, venting such gases to atmosphere in an amount such that the arsenic removed from the bed by the gases so vented at least equals the rate at which new ore contaminated with arsenic is supplied to the grate, and recycling gases from the firing zone ahead of the point of separate removal of gases and following the point of such separate removal of gases to the preliminary zone and passing the same through the bed of ore in that zone.

6. The method of firing pellets of iron ore contaminated with arsenic to remove substantial amounts of the arsenic which comprises continuously feeding the green pellets onto one end of a traveling grate sintering strand and removing them at the other and wherein the sintering strand carries the pellets in succession through an updraft drying zone, a downdraft drying zone, a downdraft preheating zone, a downdraft combined firing and afterfiring zone and then a first and a second updraft cooling zone, which method comprises blowing air upwardly through the bed of pellets in the second cooling zone and then circulating it to the updraft drying zone to initially warm and dry the pellets, blowing air upwardly through the pellets in the first stage cooling and forcing the air after passing through the pellets in this zone into the firing and after-firing zone where it is used as combustion air, the combustion gases being moved downwardly through the bed of pellets in the firing and after-firing zone and maintaining the temperature and time of firing sufficient to heat the lowermost pellets in the bed to a maximum temperature of about 2350° F. at a point intermediate the beginning and the end of the firing and after-firing zone, separately withdrawing gases that pass through the bed in the region where and immediately following the point where the maximum temperature in the lower portion of the bed is reached and where the arsenic vapors are in high concentration and so venting the gases thus separated that the rate of removal of arsenic as vapor reaches equilibrium with the rate at which arsenic is supplied by the feed of green pellets to the machine, and utilizing the remaining gases that pass through the bed in the firing and after-firing zone in the downdraft drying and preheating zones.

7. A sintering machine of the traveling grate type designed for the processing of iron ore with which arsenic is combined to effect the removal of a substantial amount of the arsenic from the ore by heat, said machine being of the type in which there is a traveling grate and there are provided hoods over the grate and groups of windboxes under the grate to provide a succession of zones through which the charge on the grate is carried for successively drying and preheating the charge followed by a combined firing and after-firing zone through which a downdraft of combustion products and heated air is effected from the hood above the grate to the windboxes below to raise the temperature of the bed to an indurating temperature and most of the arsenic is sublimated, the combined firing and after-firing zones being followed by a cooling zone through which air is passed to cool the charge and recuperate the heat therefrom, the air so heated being utilized at least in part in the combined firing and after-firing zone characterized by (a) the windboxes under the combined firing and after-firing zone comprising a succession of three groups,
(b) means for conducting heated gases from the windboxes of the first and third of said three groups into the zones ahead of the combined firing and after-firing zone to effect drying and preheating of the charge,
(c) a vent duct discharging directly to atmosphere connected with the group of windboxes in the combined firing and after-firing zone which is intermediate said first and third groups and therefore in the place where the greatest percentage of arsenic being released from the charge occurs,
(d) and an exhaust fan in said vent duct for effecting a flow of air and gases from the windboxes of said intermediate group separately from the flow of gases from the windboxes of the said first and third groups and discharging all of the air and gases from said intermediate group to atmosphere while recuperating heat from the windboxes of the first and third windbox groups under the combined firing and after-firing zone.

References Cited by the Examiner
UNITED STATES PATENTS

| | | | |
|---|---|---|---|
| 2,977,215 | 3/1961 | Meyer et al. | 75—5 |
| 3,088,723 | 5/1963 | Haley et al. | 75—5 |
| 3,172,754 | 3/1965 | Anthes et al. | 75—5 |

FOREIGN PATENTS

| | | |
|---|---|---|
| 600,026 | 6/1960 | Canada. |
| 1,215,231 | 11/1959 | France. |

BENJAMIN HENKIN, *Primary Examiner.*